United States Patent [19]

Sugiyama et al.

[11] Patent Number: 5,050,988
[45] Date of Patent: Sep. 24, 1991

[54] MEASURING DEVICE USING OPTICAL BEAM

[75] Inventors: Tadashi Sugiyama; Akira Ohte, both of Tokyo, Japan

[73] Assignee: Yokogawa Electric Corporation, Tokyo, Japan

[21] Appl. No.: 498,167

[22] Filed: Mar. 23, 1990

[30] Foreign Application Priority Data

| Mar. 30, 1989 | [JP] | Japan | 1-80061 |
| Mar. 30, 1989 | [JP] | Japan | 1-80066 |
| Mar. 30, 1989 | [JP] | Japan | 1-80067 |
| Mar. 31, 1989 | [JP] | Japan | 1-80718 |

[51] Int. Cl.$^5$ .................................. G01J 1/00
[52] U.S. Cl. ............................. 356/121; 356/358
[58] Field of Search .................. 356/121–124, 356/128, 222, 239, 364, 369, 358; 372/38, 29–31, 93, 54, 53

[56] References Cited

U.S. PATENT DOCUMENTS 3,625,619 12/1971 Karl ................................. 356/128
4,681,436 7/1987 Ching et al. ...................... 356/121

OTHER PUBLICATIONS

Dynamic Spectroscopy and Subpicosecond Pulse Compression, Applied Physics Letter, vol. 27, No. 9, 1 Nov. 1975, Ippen and Shank.
IOFFE Phys. Tech. Inst., Determination of Refractive Index of Material in the IR Band, 1987, Derwent Publication Ltd.

Primary Examiner—Richard A. Rosenberger
Assistant Examiner—Hoa Pham
Attorney, Agent, or Firm—Moonray Kojima

[57] ABSTRACT

A device for measuring ultra-high speed phenomenon by using an optical beam. The ultra-high speed phenomenon can be measured at a high S/N ratio by composing either an object light or a reflected light from an object and a reference light using a polarizer, by generating a secondary higher harmonic from the composed light using a non-linear optical material, and by measuring the optical intensity of the secondary higher harmonic using a light receiving element.

12 Claims, 19 Drawing Sheets

MEASURING DEVICE USING OPTICAL BEAM

BACKGROUND OF THE INVENTION

1. Field of Invention

This invention relates to a measuring device capable of measuring urging an ultra-high speed phenomenon at a high signal-to-noise (S/N) ratio by using an optical beam.

2. Description of the Prior Art

FIG. 1 shows a conventional measuring device comprising an SHG correlator for measuring the width of an optical pulse by using the autocorrelation method. The repetitive pulses to be measured are halved by a half mirror 1 into two branches, the transmitted branch of which is reflected by mirror 2. On the other hand, the reflected branch has its advancing direction inverted by a corner cube 3 so that it is composed with the beam reflected by mirror 2. The beam thus composed is converged by an objective lens 4 to enter an SHG crystal 5.

SHG crystal 5 generates and outputs the secondary higher harmonic light of the incident beam. This secondary higher harmonic light is selected by a filter 6 so that its optical intensity is measured by a light receiving element 7. Thus, the pulse width of the beam can be measured by moving the corner cube 3 in the direction of the arrows to change the distance from the half mirror 1, i.e. the difference between the two optical path lengths.

A GaAs substrate has an electrooptic property wherein the polarizing plane of the reflected light is changed depending on the current flow. FIG. 2 shows a device for measuring the electric current flowing through a GaAs integrated circuit using such electrooptic properties. The output light from a YAG laser 8 is compressed by pulse compressing unit 9 to have a pulse width of picoseconds so that it is guided through a polarizer 10 and wave length plates 11 into a GaAs integrated circuit 12.

On the other hand, the reflected light passes through wave length plates 11 so that only light having a specific polarizing plane is selected by the polarizer 10 to enter a light receiving element 13. Light receiving element 13 converts the optical intensities of the incident light into electric signals. If the current to flow through the GaAs integrated circuit 12 changes, the polarizing plane of the reflected light is changed to change the intensities of the light incident upon light receiving element 13. In synchronism with the timing of the output light of YAG laser 8, a drive circuit 14 feeds an electric current to the GaAs integrated circuit 12. If the phase difference is shifted little by little, it is possible to measure the current to flow through GaAs circuit 12 and accordingly the operations of circuit 12. The measured results are displayed in display unit 15.

The device of FIG. 1, has certain problems. For example, because of the use of the autocorrelation method, the shape of the pulses cannot be measured. If the pulse is/of a different shape the pulse width is measured to be different. Moreover, since the secondary higher harmonic is generated by the SHG crystal, a weak light cannot be measured. Furthermore, although repetitive optical pulses can be measured, essentially coherent optical pulses cannot be measured.

On the other hand, the FIG. 2 device also has problems. For example, since the intensity of the light incident upon the light receiving element 13 is fine, it is difficult to increase the S/N ratio, hence signal processing, such as additive averaging, has to be executed. Moreover, a single phenomenon cannot be measured.

SUMMARY OF THE INVENTION

Accordingly, an object of the invention is to overcome the foregoing and other problems and deficiencies of the prior art.

Another object is to provide a device for measuring an ultra-high speed phenomenon by using an object light to be measured and a reference light having a shorter time width, and by scanning the object light with the reference light.

A further object is to provide a device for measuring the object light at a high S/N ratio by composing the reference light and the object light to measure the optical intensity of the secondary high frequency light and by intensifying the reference light even in case the object light has a low optical intensity.

A still further object is to provide a device for measuring the operations of a GaAs integrated circuit, or the like, by measuring the amount of electricity flowing through the integrated circuit using optical pulse measuring techniques.

DESCRIPTION OF THE PREFERRED EMBODIMENTS

Figure 1:
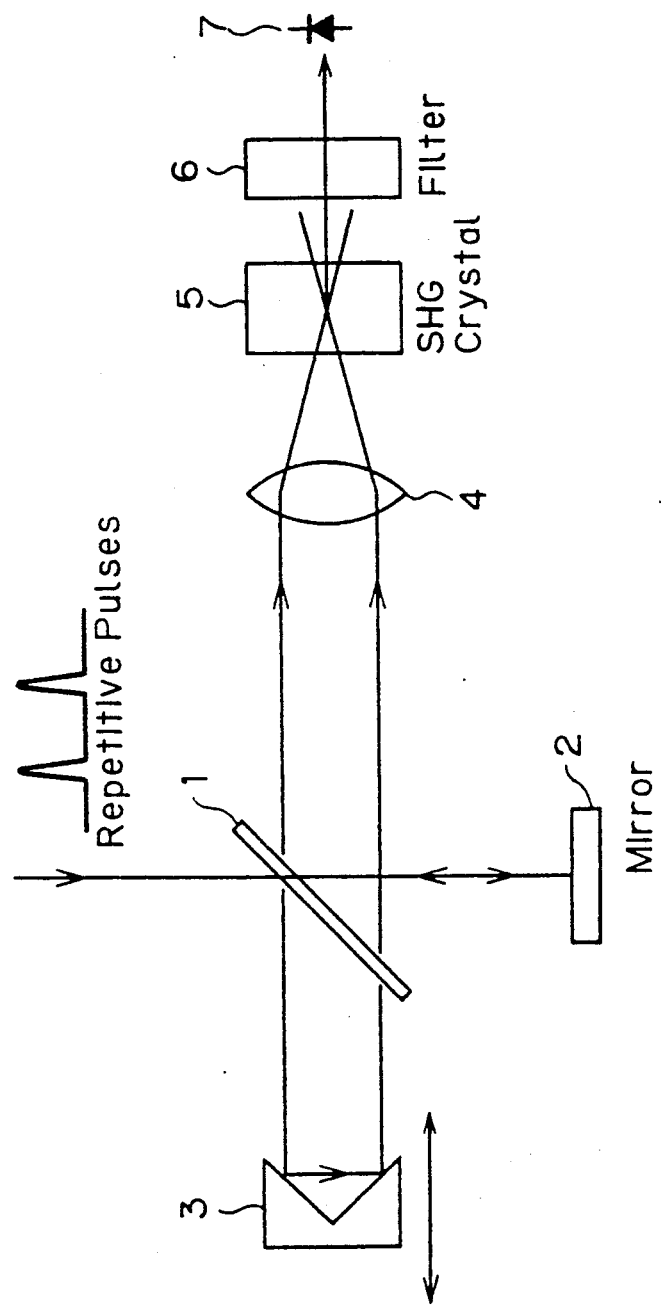
FIG. 1 is a diagram depicting a conventional method of measuring optical pulses.
Figure 2:
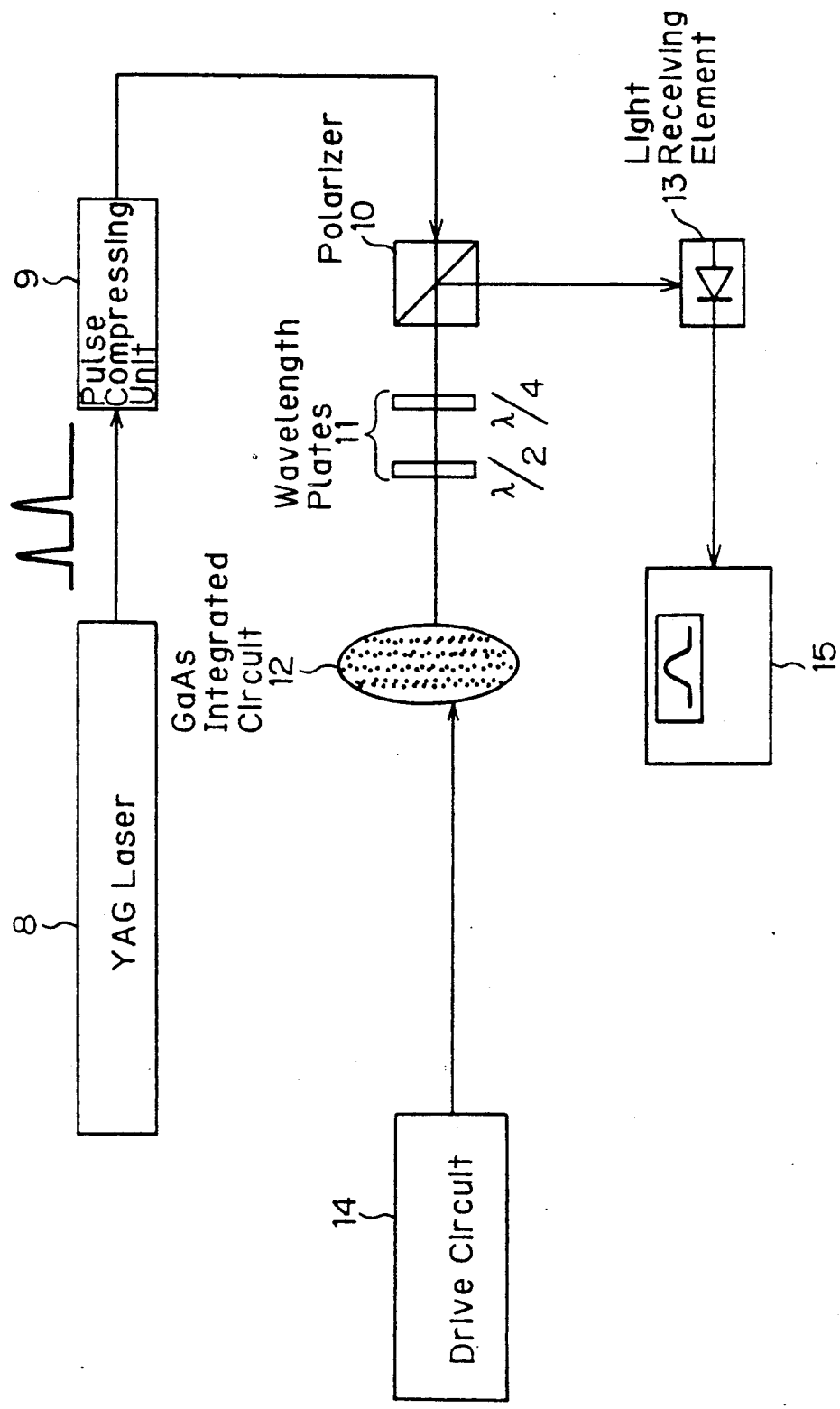
FIG. 2 is a diagram depicting another conventional method of measuring optical pulses using a GaAs integrated circuit.
Figure 3:
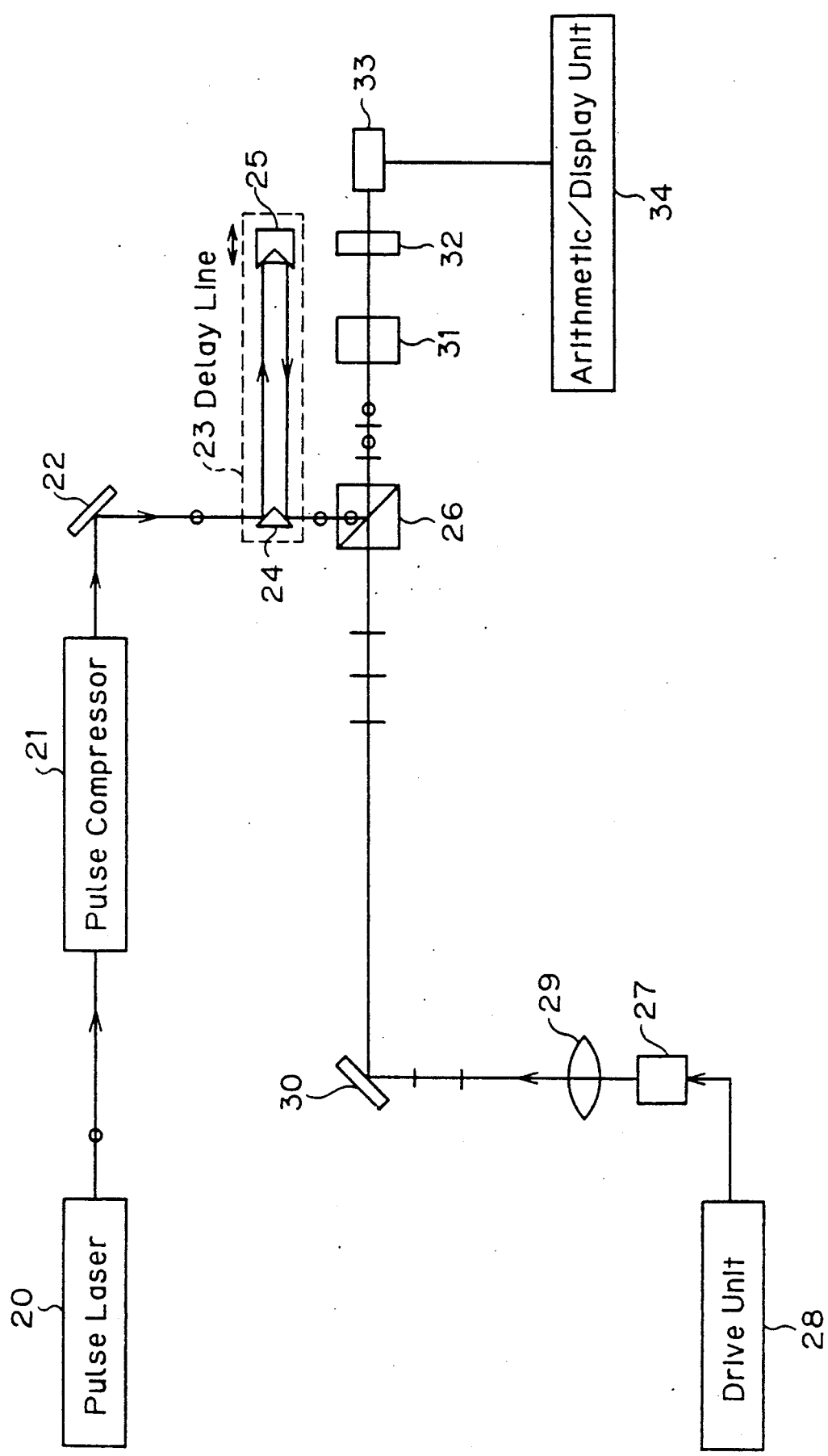
FIG. 3 is a block diagram depicting an illustrative embodiment of the invention.

FIG. 3 depicts the structure of a device for measuring the characteristics of optical pulses, wherein a pulse laser 20 generates optical pulses which are polarized at right angles to the paper surface, as indicated at circles "0". The output pulse beam of laser 20 is introduced and compressed on the time axis. The optical pulses thus compressed will be called the "reference light" in the following description.

The reference light is reflected by a mirror 22 to enter an optical delay line 23. This delay line 23 comprises a mirror 24 and a corner cube 25. Corner cube 25 is made to be movable in the directions indicated by the arrows. The reference light incident upon delay line 23 is reflected by mirror 24 to enter corner cube 25, at which the reference light is turned and then reflected again by mirror 24 until the light is outputted to the outside. As a result the delay time can be changed by moving corner cube 25 in the directions of the arrows to change the distance from mirror 24. A polarizer 26 receives the reference light which has been delayed on the time axis by delay line 23.

An object light to be measured is outputted from light source 27, which is driven by drive unit 28. It is assumed that the object light is polarized in the paper plane, as indicated at the lines by "|". The object light is converted by a lens 29 and is reflected by a mirror 30 to enter polarizer 26.

Polarizer 26 composes and outputs the two incident lights, i.e. the reference light delayed by delay line 23 and the object light outputted from source 27. These two lights are linearly polarized at right angles so that they can be composed into a common optical path. The composed light is incident upon a higher harmonic generating means 31 which is made of a non-linear optical material, such as, KDP crystal, for generating the secondary higher harmonic of the incident light.

The output light from higher harmonic generating means 31 is introduced into a filter 32 so that only the secondary higher harmonic is selected. This secondary higher harmonic is incident upon a light receiving element 33 so that its optical intensity is converted into electric signals, which are applied to an arithmetic/display unit 34 to compute and display the pulse width and shape of the object light.

Figure 4:
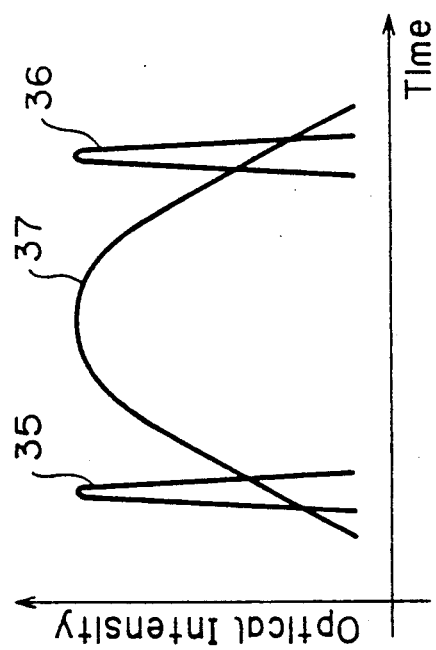
FIG. 4 is a diagram depicting the relationships of object light, reference light and time.

The operation of the device thus constructed will now be described. The reference light and object light are composed in polarizer 26, but the reference light is compressed on the time axis by pulse compressor 21 so that its pulse width is narrower than that of the object light. In FIG. 4, there is shown the time relationship of reference light and object light at the output side of polarizer 26. The abscissa indicates time and the ordinate indicates optical intensity. Numerals 35 and 26 indicate the peaks of the reference light, and number 37 indicates the peak of the object light. By changing the delay time of delay line 23, the time relationships of reference light and object light can be changed, as indicated at peak 35 or peak 36. In other words, the object light can be scanned with the reference light. These two lights are composed in polarizer 26 and introduced into high frequency light generating means 31. Higher harmonic generating means 31 generates the secondary higher harmonic of the incident light, the intensity P of which is expressed by $$P = r_{123} \cdot E_1 \cdot E_2 / 2 \ldots \quad (1)$$

wherein $r_{123}$ is a coefficient expressing feasibility of non-linear effect; $E_1$ is the optical intensity of the object light; and $E_2$ is the optical intensity of the reference light.

Only when the reference light and the object light are overlapped on the time axis, does higher harmonic generating means 31 generate the secondary higher harmonic having an intensity proportional to the product of the intensities of these two lights. The optical intensity of this secondary higher harmonic is converted into electric signals by light receiving element 33.

If the reference light has a constant optical intensity, therefore, the magnitude of the output of the light receiving element 33 is proportional to the optical intensity of the object light of that portion, in which the object light is overlapped upon the reference light. If the delay time of the delay line 23 is changed to scan the object light with the reference light, the pulse width of the object light can be measured. With the intensity of the reference light being constant, on the other hand, the shape of the pulses of the object light can be determined. As is apparent from equation (1), the intensity P of the secondary higher harmonic is proportional to the product of the optical intensities of the object light and the reference light. As a result, the intensity P of the secondary higher harmonic can be increased by intensifying the reference light so that the object light can be measured at a high S/N ratio even in case of low optical intensity.

Figure 5:
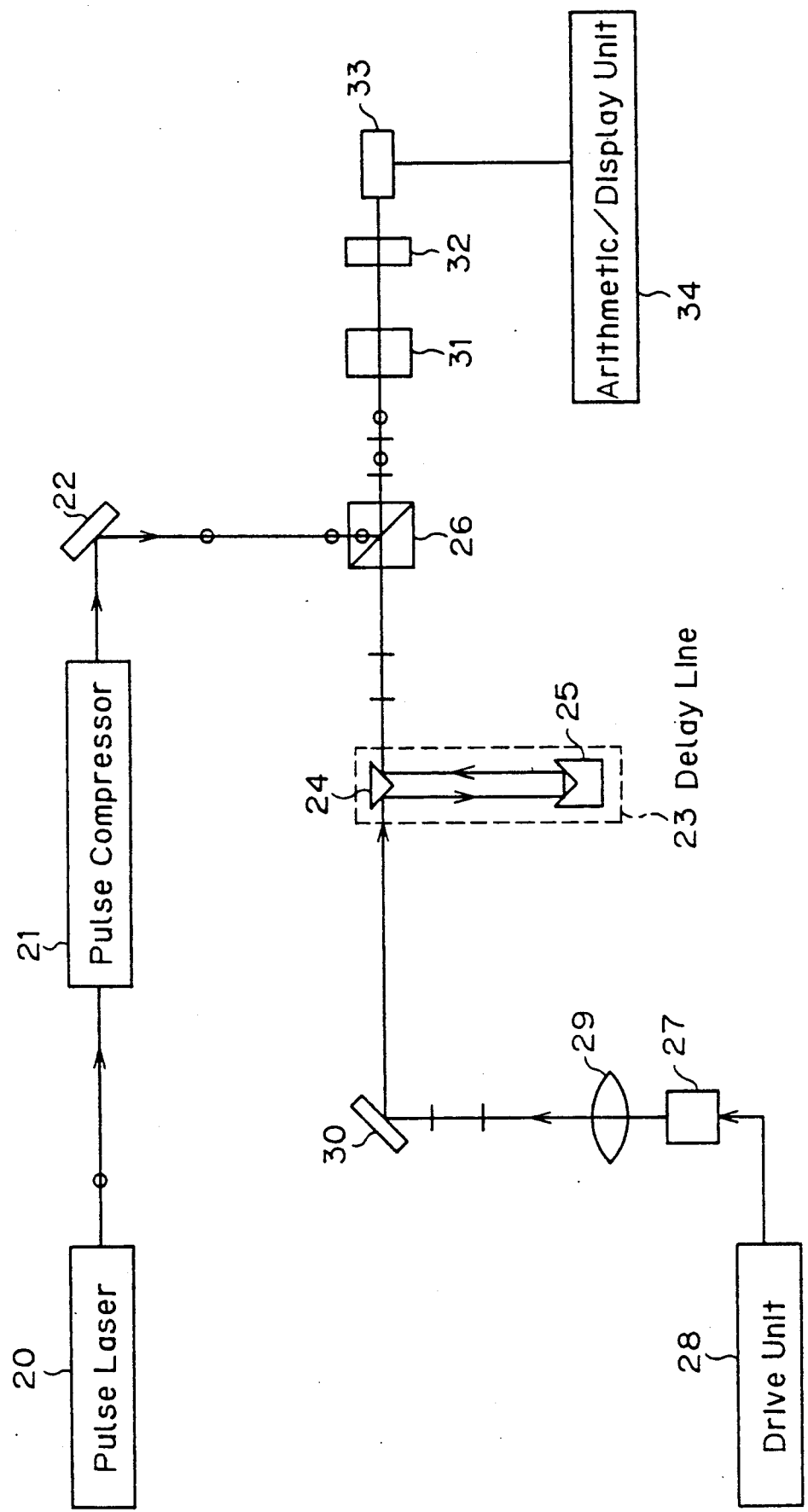
FIG. 5 is a block diagram depicting another illustrative embodiment of the invention
Figure 6:
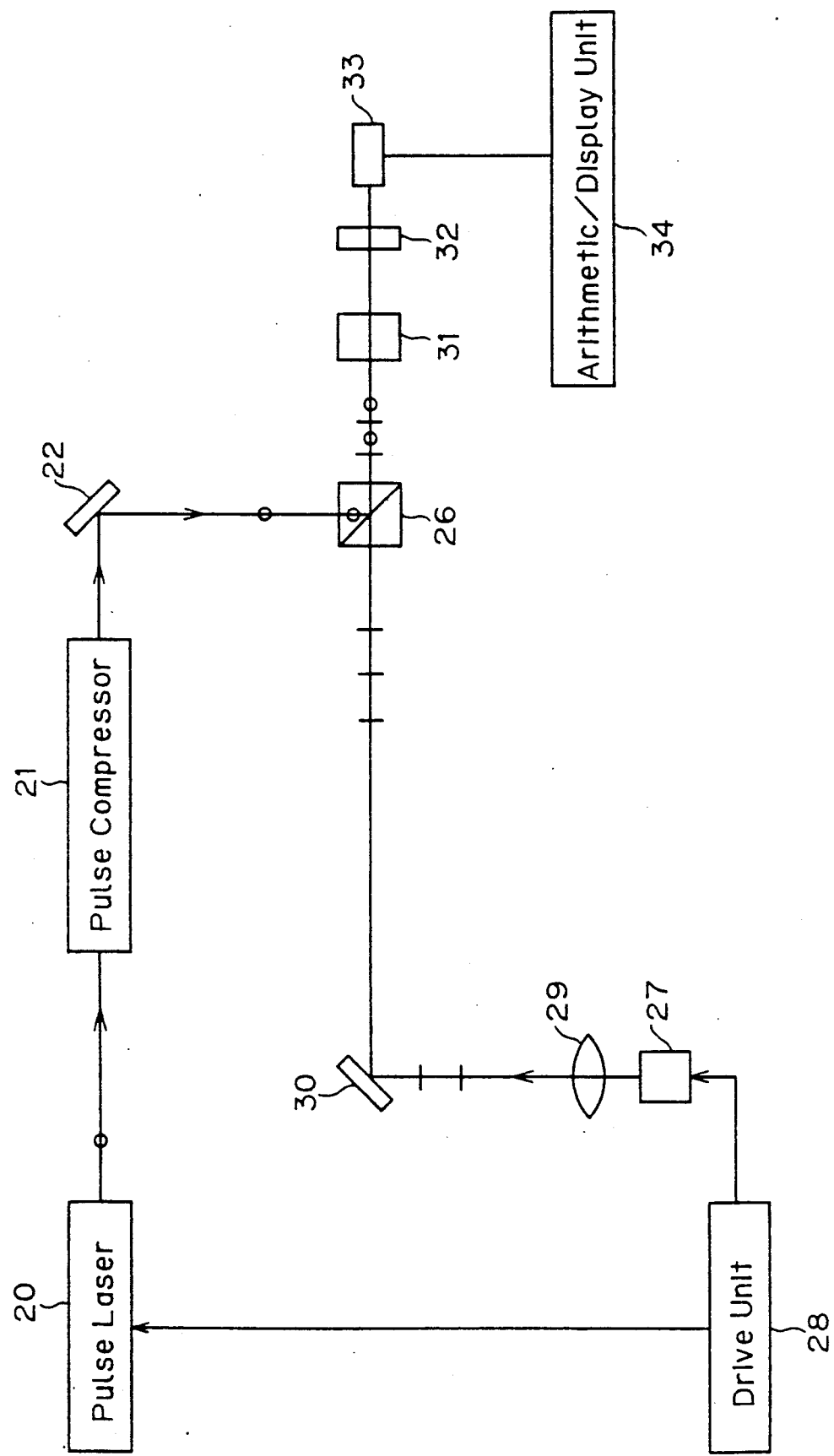
FIG. 6 is a block diagram depicting a further illustrative embodiment of the invention.

FIGS. 5 and 6 depict modifications of the FIG. 3 embodiment, wherein the parts having the same functions as those in FIG. 3 are designated with the same reference numerals, and description thereof is omitted hereat for sake of clarity.

In FIG. 5, delay line 23 is inserted into the optical path between mirror 30 and polarizer 26 to delay the object light.

in FIG. 6, delay line 23 is not used, but, both light source 27 and pulse laser 20 are driven at a slightly displaced timing by drive unit 28.

in order to determine the pulse width and shape of the object light, the measurement may be accomplished by sequentially displacing the phase differences between the reference light and the object light. Thus, the FIGS. 5 and 6 embodiments produce the same effects as those of the FIG. 3 embodiment.

Figure 7:
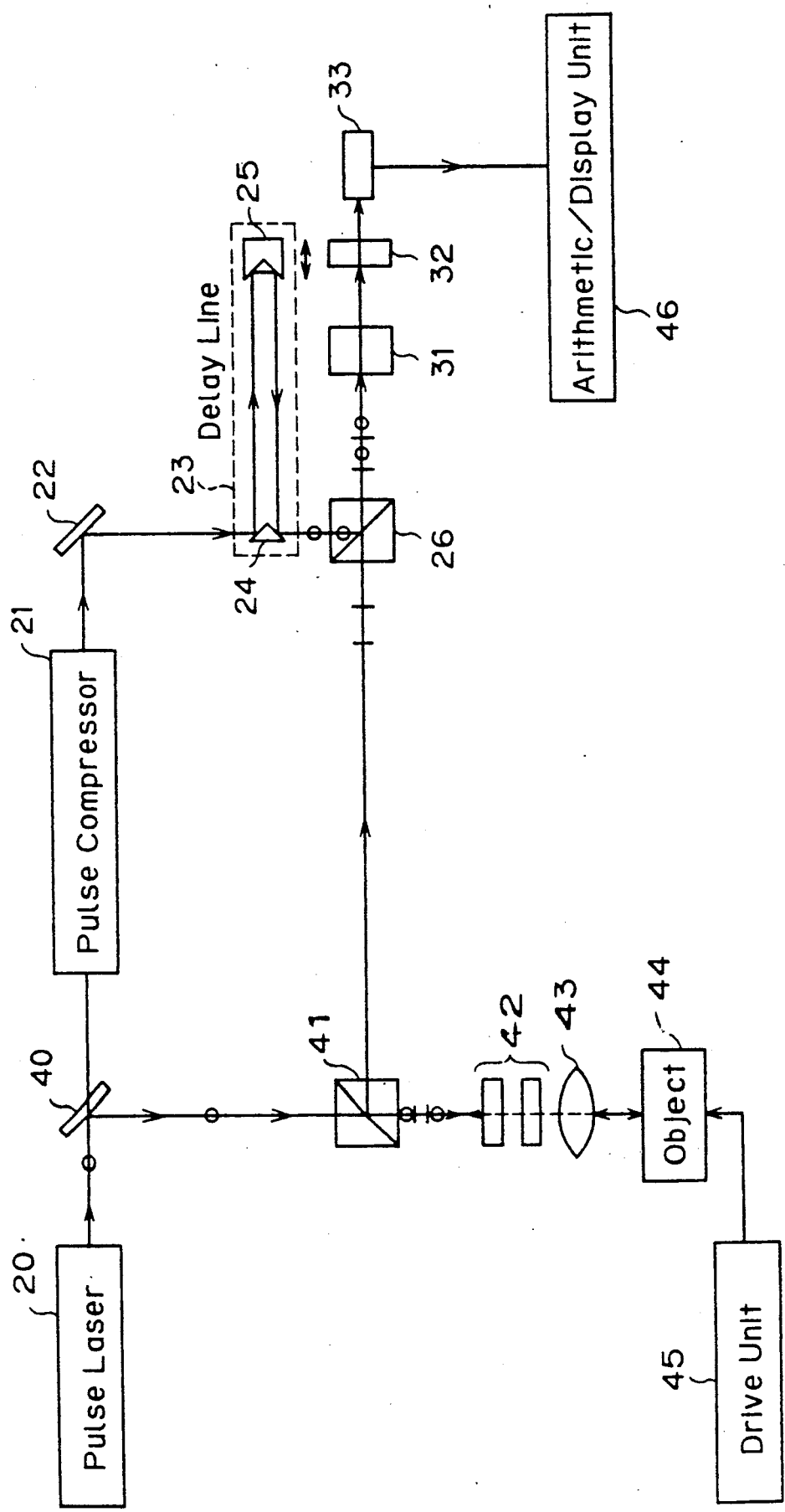
FIGS. 7, 8 and 9 are block diagrams depicting three different embodiments of the invention using GaAs integrated circuits.

FIG. 7 shows the structure of a device for measuring the amount of electric current flowing through an object or a GaAs integrated circuit, by applying the principles of optical pulse measurement of FIG. 3. IN FIG. 7, the parts having the same functions as those of FIG. 3 are designated with the same reference numerals, and description thereof is omitted hereat for sake of clarity. In FIG. 7, the output light from pulse laser 20 is incident upon a half mirror 40 so that the output light is split into two branches. The transmitted branch enters pulse compressor 21 so that a narrow reference light is prepared. The reflected branch is sent through a polarizer 41 and then through a half-wavelength plate and a quarter-wavelength plate 42, and is converged by an objective lense 43, to irradiate object 44 to be measured. Object 44 is e.g., a GaAs integrated circuit and is driven by drive unit 45.

The GaAs integrated circuit has electrooptical properties which reflect the irradiated light by changing the plane of polarization. This change in the polarization plane is caused by electric current flowing through the GaAs integrated circuit. Hence, the current flowing through object 44 can be measured by measuring the change in the polarization plane of the reflected light of object 44.

The reflected light from object 44 is incident upon polarizer 41, which reflects only the light polarized in the plane of the paper, as indicated by "|". The light thus reflected by polarizer 41 corresponds to the object light of the embodiment of FIG. 3. The wavelength plate 42 is so adjusted that the intensity of light reflected by polarizer 41 and polarized in the paper plane, may be maximized.

The intensity of reflected light from polarizer 41 is detected in the same manner as in FIG. 3. Polarizer 26 composes the reference light delayed by delay line 23 and the reflected light from polarizer 41. The secondary higher harmonic of the composed light is generated by higher harmonic generating means 31, and its optical intensity is converted into electric signals by light receiving element 33. Since the polarization plane of the reflected light of the object 44 is changed with the current flowing through object 44, as has been heretofore described, the intensity of the light selected by polarizer 41 and polarized in the paper plane, that is, the magnitude of the output of light receiving element 33 is changed with the current flowing through object 44.

Thus, the change in the current flowing through object 44 can be measured by having drive unit 45 feed current periodically to object 44 and by shifting the delay time of delay line 23 little by little. The arithmetic/display unit 46 converts and displays the output from light receiving element 33 into change of current flow through object 44. As is apparent from the foregoing equation (1), the intensity P of the secondary higher harmonic can be increased if the optical intensity of the reference light is increased. As a result, the measurements can be accomplished at a high S/N ratio by increasing the intensity of the reference light even if the reflected light from object 44 is weak.

Figure 8:
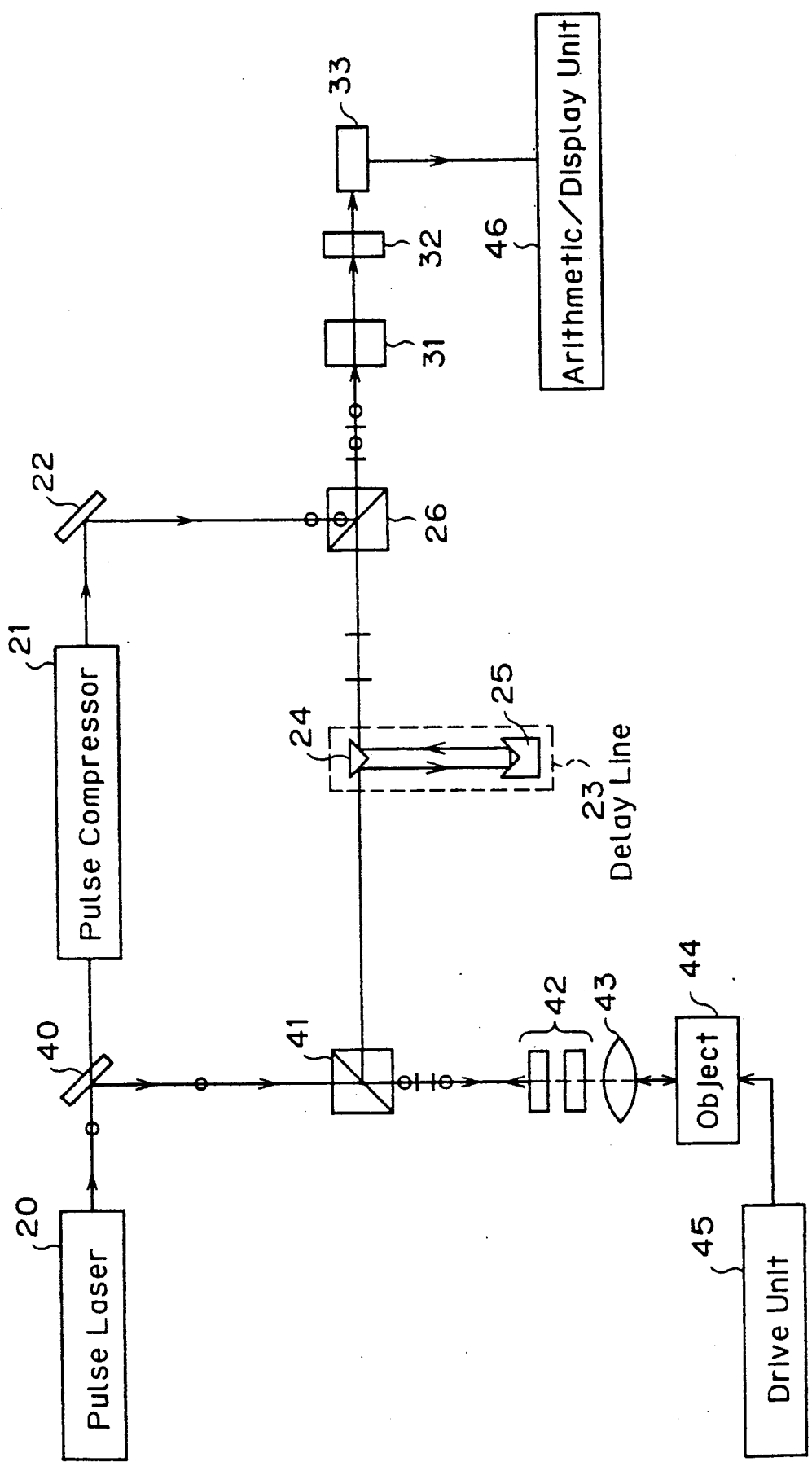

FIG. 8 is a modification of the embodiment of FIG. 7, wherein the parts having the same functions as those in FIG. 7 are designated with the same reference numerals and description thereof is omitted hereat for sake of clarity. In FIG. 8, the reflected light from object 44 is delayed, instead of the reference light as in FIG. 7, by delay line 23. In order to measure the time change of the current flowing through object 44, the phase difference between the reference light and the reflected light from object 44 is sequentially changed so that the same effects as those of the FIG. 7 embodiment, are achieved.

Figure 9:
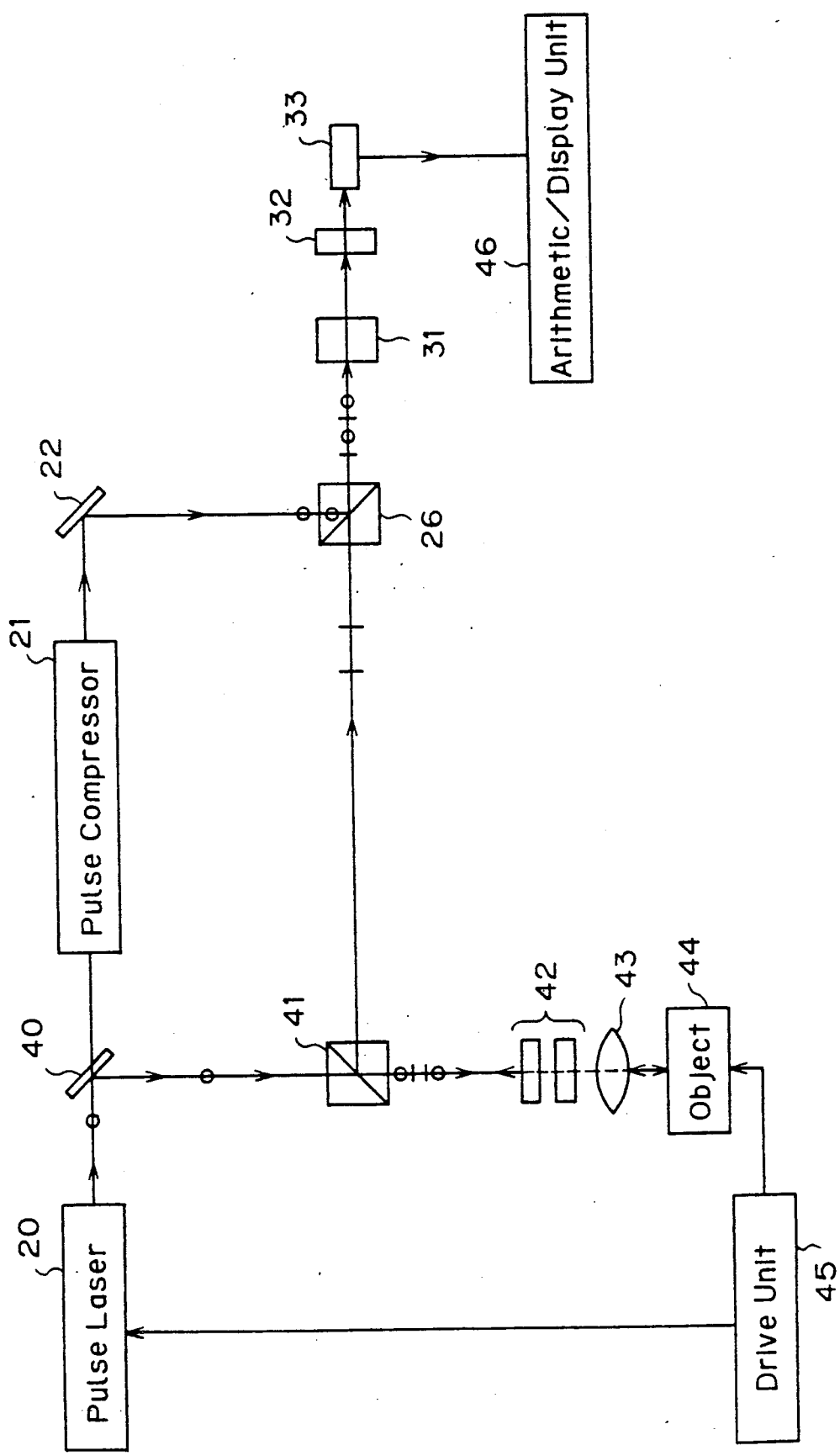

FIG. 9 is another modification of FIG. 7, wherein the same parts as in FIG. 7 have the same reference numerals and description thereof is omitted hereat for sake of clarity. In FIG. 9, a delay line is not used, but, both object 44 and pulse laser 20 are driven by drive unit 45 at slightly different driving timings. Using this embodiment, also, the phase difference between the reflected light from object 44 and the reference light is displaced to measure the time change of the current flowing through object 44.

In the embodiments of FIGS. 3, 5 and 6, the optical pulses or the object light should be repetitive. On the other hand, in FIG. 10, the embodiment is capable of measuring single shot optical pulses.

Figure 10:
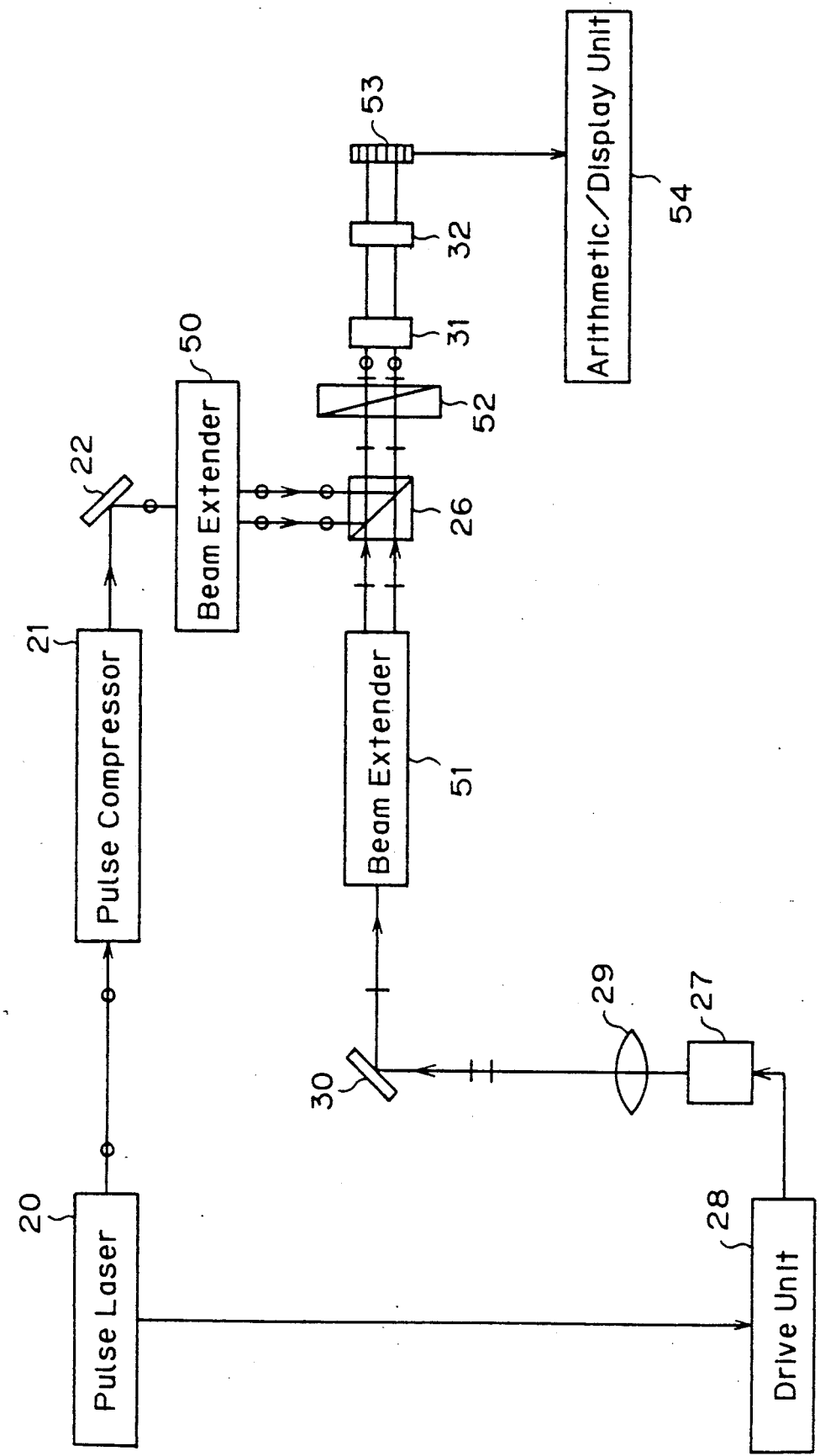
FIG. 10 is a block diagram depicting a still further illustrative embodiment of the invention.

In FIG. 10, the parts having the same functions as those in FIG. 3 have the same reference numerals and description thereof is omitted hereat for sake of clarity. The output light from pulse laser 20 is compressed on the time axis by pulse compressor 21 and is reflected by mirror 22. After this, the reflected light is spatially extended by a beam extender 50. The output light from beam extender 50 is polarized, as indicated by "0", at right angles to the paper plane so that it acts as the reference light.

On the other hand, the output light from light source 27, driven by the drive unit 28, that is, the object light, is converged by objective lens 29 and is reflected by mirror 30. After this, the reflected light is spatially extended by a beam extender 51. This object light is polarized in the paper plane as indicated by "|".

Polarizer 26 composes the reference light and the object light thus spatially extended. These two lights are linearly polarized waves at right angles, as has been described with reference to FIG. 3, so that they can be composed on a common optical path. The composed light is introduced into a Babinet compensator 52.

Babinet compensator 52 gives only the light of a specific plane of polarization a different delay time depending on the position in a normal plane in the advancing direction of the light. The output light from Babinet compensator 52 is introduced into higher harmonic generating means 31 to generate a high frequency light, which is selected by filter 32. The secondary higher harmonic thus selected or filtered by filter 32 is incident upon a line sensor 53. This sensor 53 has a plurality of light receiving elements linearly arranged to measure the spatial distribution of the secondary higher harmonic. An arithmetic/display unit 54 calculates and displays the pulse width and shape of the object light from the measured results.

Figure 11:
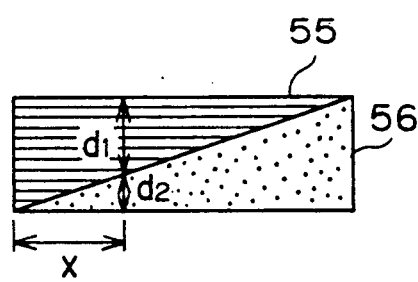
FIG. 11 is a diagram depicting the structure of a Babinet compensator.

FIG. 11 shows the structure of the Babinet compensator 52, wherein wedge shaped crystals 55 and 56 are combined such that crystal 55 has its optical axis in parallel with the paper plane whereas crystal 56 has its optical axis at right angles to the paper plane. Since the crystal has double refraction, crystals 55 and 56 are given different refractive indexes by such combination. If those refractive indexes are designated as $n_o$ and $n$ and if crystals 55 and 56, at the position x from the left end of Babinet compensator 52, have thicknesses $d_1$ and $d_2$, respectively, as shown in FIG. 11, the optical length $L(x)$ of Babinet compensator 52 for light polarized in the paper plane is expressed by $$L(x) = (d_1 - d_2) \cdot (n_o - n\ )$$

This equation implies that the time for transmitting through the Babinet compensator is different for position x. The light polarized at right angles to the paper plane is given by a constant delay.

The operation of the FIG. 10 embodiment is as follows. Pulse laser 20 and drive unit 28 are synchronized to adjust their operational timings so that the time relations of the object light and the reference light take the relationships shown in FIG. 12. Specifically, reference light 57 is positioned at the center of object light 58. The reference light is compressed on the time axis by pulse compressor 21 so that its pulse width is narrower than that of the object light. These two lights are composed by polarizer 26 and introduced into the Babinet compressor 52. The operations downstream of the Babinet compensator 52 will be described with reference to FIG. 13.

As priorly stated, Babinet compensator 52 gives only the light polarized in the paper plane, the delay times which are different for the different light incidence positions. In other words, the object light has a different delay time for a different position, but the reference light has a constant delay time irrespective of the position. Since the object light and the reference light before being incident upon the Babinet compensator 52 take the time relationships shown in FIG. 12, object light 58 and reference light 57 at positions A and B in FIG. 13 take the time relationships shown in FIG.

14(A) and 14(B). Specifically, in FIG. 13, object light 58 precedes at point A, whereas reference light 57 precedes at point B. A light, having a phase difference continuously distributed, is obtained between points A and B. The output light from Babinet compensator 52 is incident upon higher harmonic generating means 31. This generating means 31 comprises, for example, a KDP crystal, and has its optical axis at about 59 degrees with respect to the light incidence direction. Higher harmonic generating means 31 generates secondary higher harmonic of the incidence light to have its intensity P in proportion to the product of the intensities of the object light and the reference light, as expressed in equation (1).

Figure 14A:
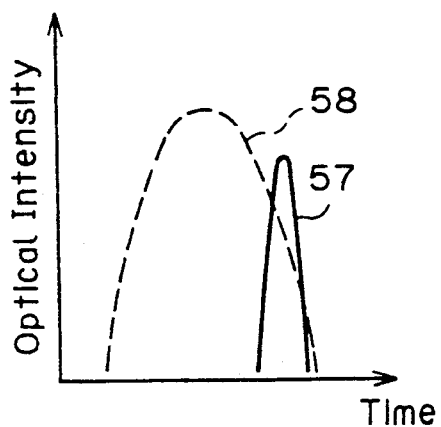
FIGS. 14(A)-14(D) are graphs depicting the relationships of object light, reference light and time.
Figure 14B:
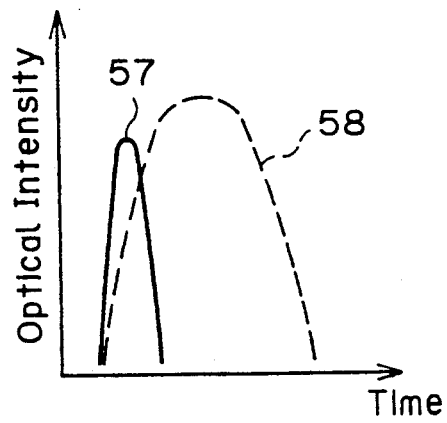
Figure 14C:
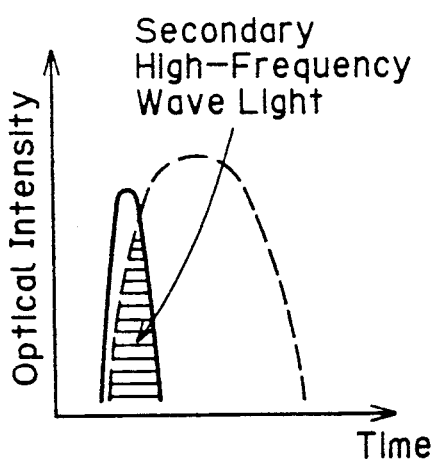
Figure 14D:
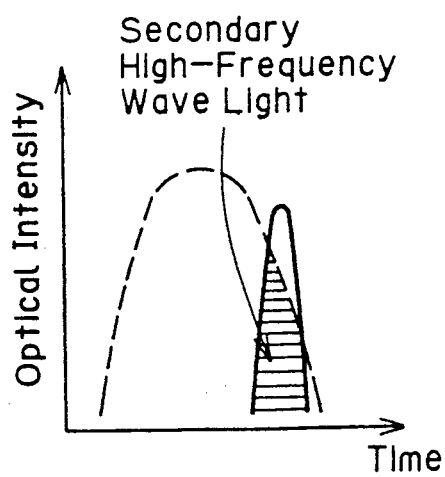

As a result, as shown in FIGS. 14(C) and 14(D), the secondary higher harmonic is generated only at the portions in which the object light and the reference light are overlapped on the time axis. Only the secondary higher frequency portion of the output light of the higher harmonic generating means 31 is extracted and introduced into line sensor 53.

Line sensor 53 has a plurality of light receiving elements arrayed on a line perpendicular to the advancing direction of the incidence light to measure the spatial distribution of the intensity of the incident light. Since the phase difference between the object light and the reference light is continuously changed by the Babinet compensator 52, as described previously, the spatial distribution of the optical intensity measured by line sensor 53 is the change in the intensity of the object light on the time axis, if it is assumed that the intensity distribution of the reference light is constant. As a result, the change of the object on the time axis can be substituted by the spatial distribution at the position of the line sensor 53 so that a single shot pulse can he measured.

Figure 15:
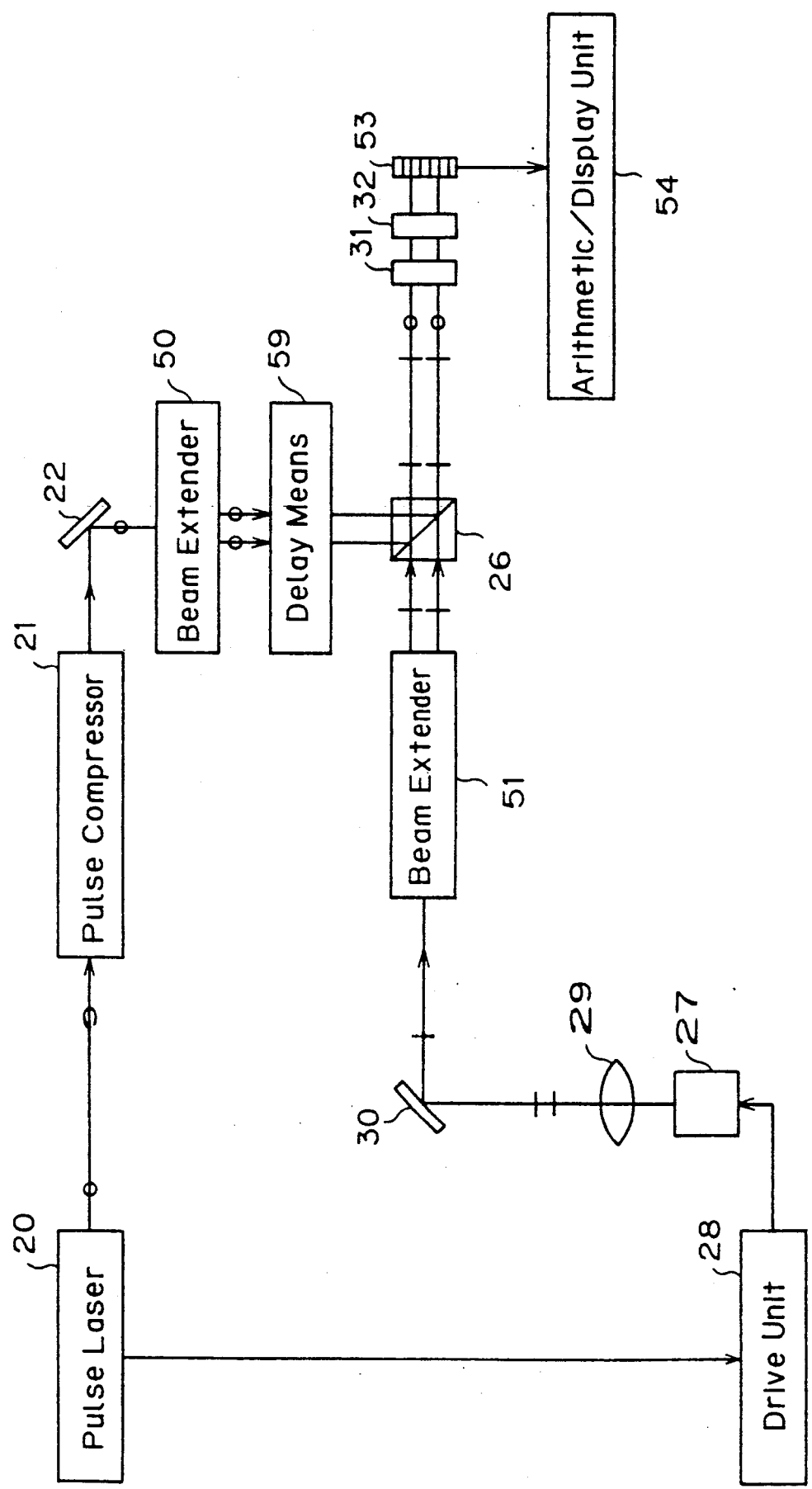
FIGS. 15 and 16 are block diagrams depicting further illustrative embodiments of the invention.

FIG. 15 shows another illustrative embodiment corresponding to the FIG. 10 embodiment, wherein parts having the same functions as those in FIG. 10 have the same reference numerals and discussion thereof is omitted hereat for sake of clarity. In FIG. 15, Babinet compensator 52 is replaced by delay means 59 which is inserted into the optical path between beam extender 50 and polarizer 26. Delay means 59 gives the reference light, which is spatially extended by beam extender 50, a delay time different for the different position of the same. Delay means 59 can be exemplified by a Babinet compensator. However, this is different from the Babinet compensator 52 used in FIG. 10, and has to be constructed to give the incident light, which is polarized at right angles to the paper plane, a delay time different for the position of the same. The light composed by polarizer 26 is introduced directly into higher harmonic generating means 31. The same effects as those obtained with the FIG. 10 embodiment are obtained with the embodiment of FIG. 15.

Figure 16:
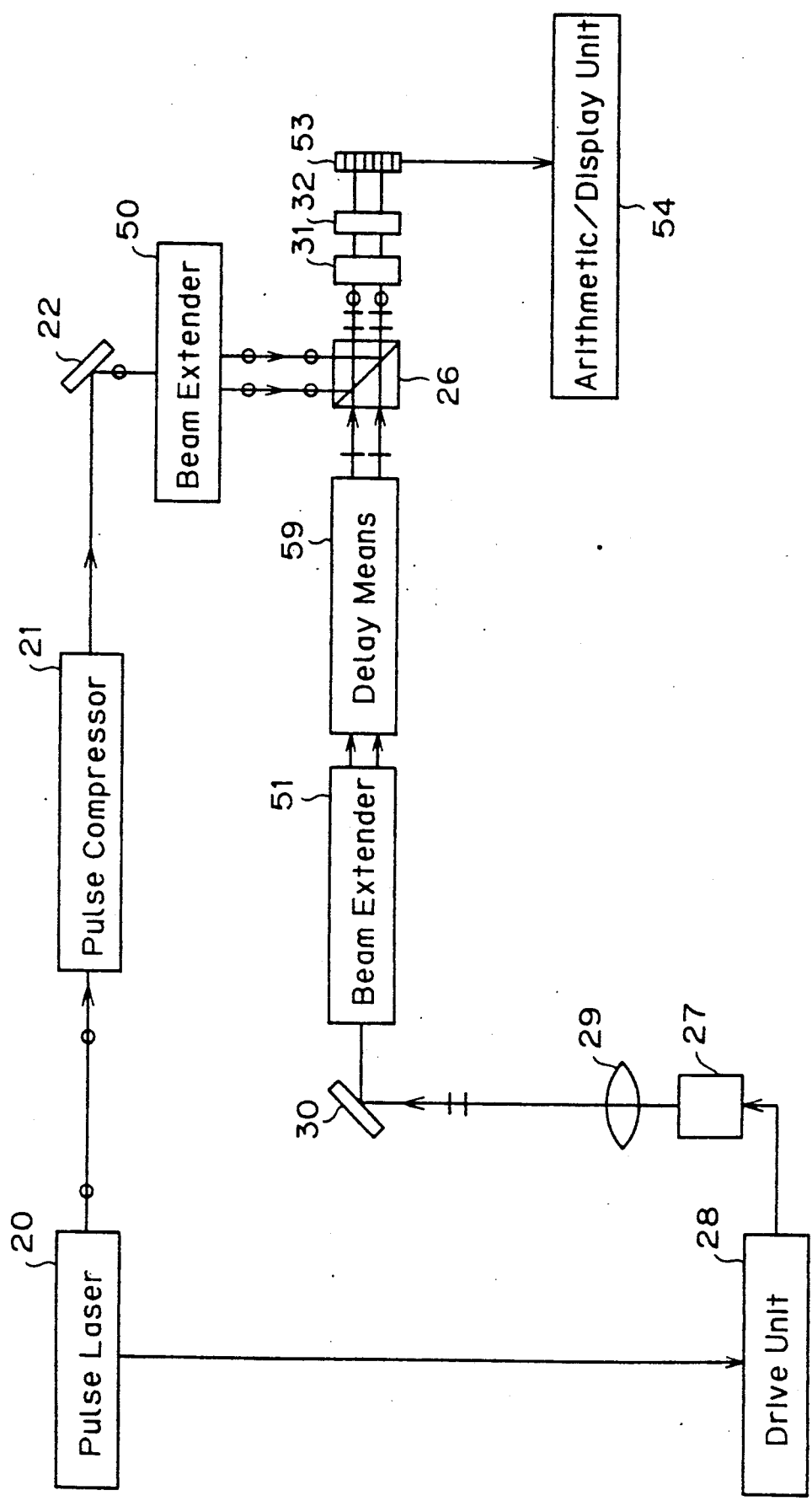

FIG. 16 shows another embodiment corresponding to the embodiment of FIG. 10, wherein similar parts bear the same reference numerals and description thereof is omitted for sake of clarity. In FIG. 16, Babinet compensator 52 is replaced by a delay means 59 inserted into the optical path between the beam extender 51 and polarizer 26. Delay means 59 gives the object light, which is spatially extended by beam extender 51, a delay time different for the different positions of the same. The delay means 59 can be a Babinet compensator, such as used in FIG. 10. Light composed by polarizer 26 is introduced, like the embodiment of FIG. 15, directly into higher harmonic generating means 31. This FIG. 16 embodiment produces the same effects as the FIG. 10 embodiment.

Figure 12:
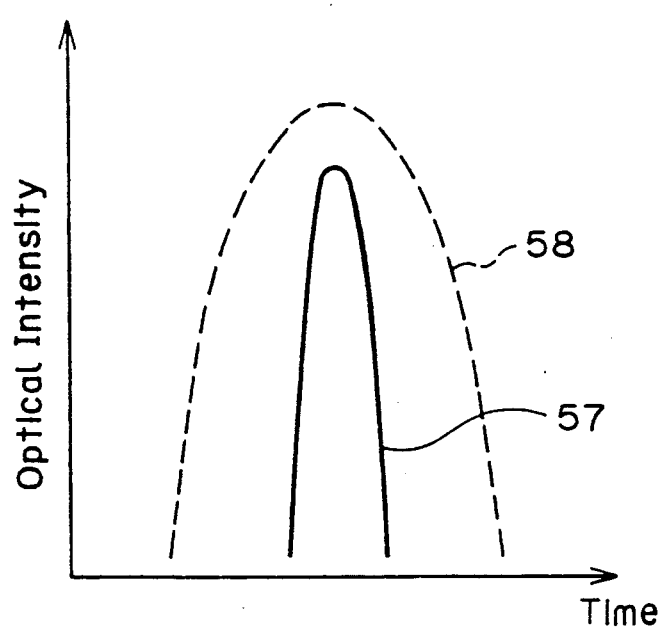
FIG. 12 is a graph depicting the relationships of object light, reference light and time.
Figure 13:
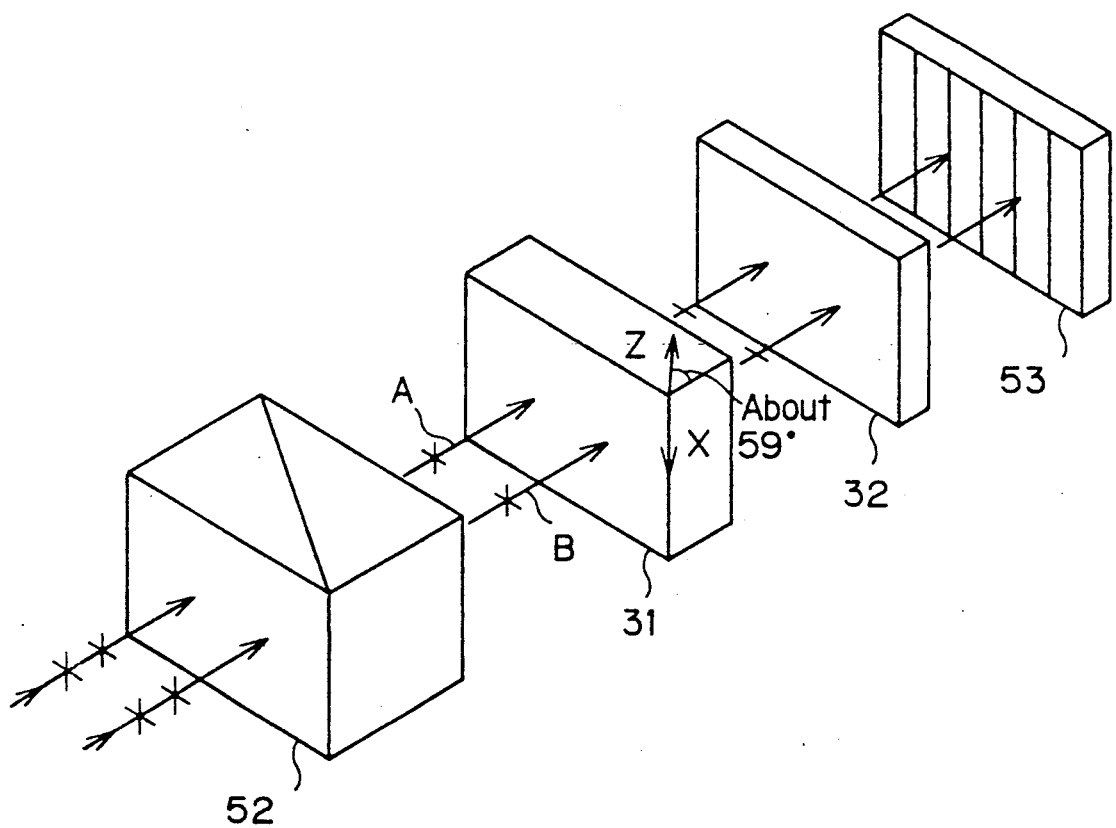
FIG. 13 is a block diagram depicting details of the structure of one part of the embodiment of FIG. 10.

Delay means 59 used in the embodiments of FIGS. 15 and 16 delays the respective lights before composition and gives a common delay time to all of the incident lights. However, unlike the embodiment of FIG. 10, delay means 59 of FIGS. 15,16 need not give only a specific plane of polarization a delay time different for the different positions. As a result, delay means can be of the structure shown in FIG. 17, wherein a mirror 60 reflects the reference light (or object light) which is spatially extended by beam extender 50 (or 51). This reflected light is introduced into a multistage corner cube 61. The light reflected by the multistage corner cube 61 is reflected again by a mirror 62 and outputted to polarizer 26. The multistage corner cube 61 is constructed by step-wisely slacking a plurality of corner cubes so that the optical path is different depending upon which corner cube the light is incident upon. As a result, the delay time can be made different at right angles to the advancing direction of the light. The number of steps of the multistage corner cube 61 may be equal to that of the light receiving elements of line sensor 53.

in the embodiments of FIGS. 10, 15 and 16, the operating time periods of light source 27 and pulse laser 20 are adjusted by drive unit 28 to cause the object light and the reference light to take the time relationships shown in FIG. 12. However, the relationships of FIG. 12 may also be satisfied by inserting a delay line 23 shown in FIG. 3, into the optical path of the object light of the reference light and by adjusting the delay time of delay line 23.

Figure 18:
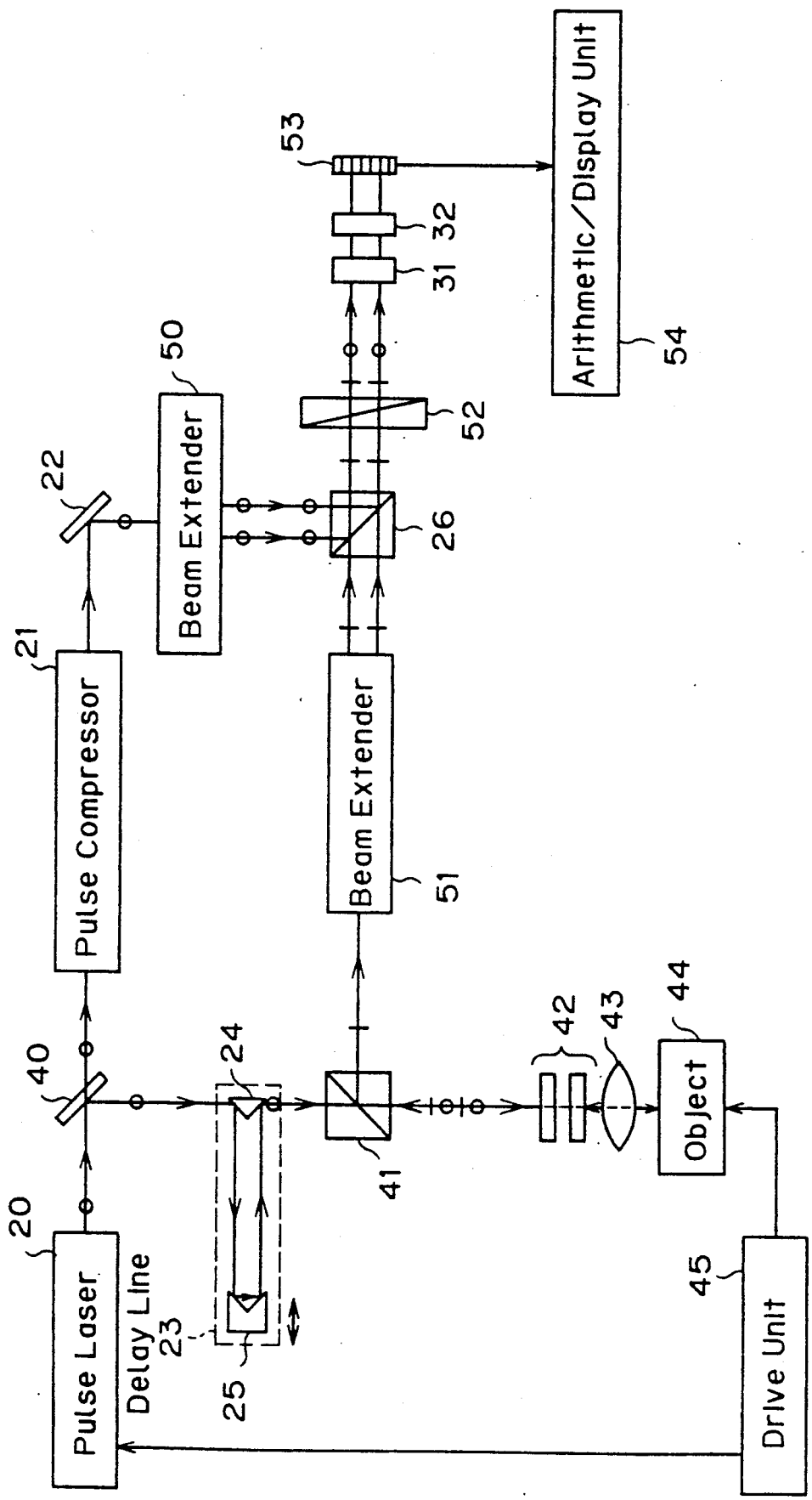
FIGS. 18, 19 and 20 are block diagrams depicting still further embodiments of the invention using GaAs integrated circuits.

FIG. 18 shows a device for measuring the amount of electric current flowing through a GaAs integrated circuit, by applying the operating principles of the device of FIG. 10. In FIG. 18, similar parts as in FIG. 10 bear the same reference numerals and description thereof is omitted hereat for sake of clarity. In FIG. 18, drive unit 45 operates the object 44 or a GaAs integrated circuit and drives pulse laser 20 in synchronism with the integrated circuit. The output light from laser 20 is halved by half-mirror 40, into two branches, one branch being guided through delay line 23 to irradiate object 44. The other branch light is compressed on the time axis by pulse compressor 21 and is spatially extended by beam extender 50 until it is introduced as the reference light into polarizer 26.

Of the reflected light from object 44, only the light polarized in the paper plane (indicated at "|") by polarizer 41 is selected and is spatially extended by beam extender 51 until it is introduced into polarizer 26. Polarizer 26 composes and outputs the two incident light to the Babinet compensator 52.

As previously described with reference to FIG. 10, only the reflected light from the object of the composed light is given a delay time by Babinet compensator 52 according to the position thereof, and the secondary high frequency light is generated only at the portions where the reference light and the reflected light from the object 44 are overlapped, by the higher harmonic generating means 31, and its spatial distribution is detected by line sensor 53.

In this embodiment, the delay time of delay line 23 is so adjusted that the reference light and the reflected light from the object 44 take the times relationships shown in FIG. 12. The measurement of electric current flowing through object 44 is done in the same manner as in the FIG. 7 embodiment. Converting of the time distribution of the current into the spatial distribution in the position of the line sensor 53 is done in the same manner as the FIG. 10 embodiment. Thus, these operational steps are omitted from being described hereat for sake of clarity. This embodiment functions to measure the single shot phenomenon on object 44 as in the embodiment of FIG. 10.

Figure 17:
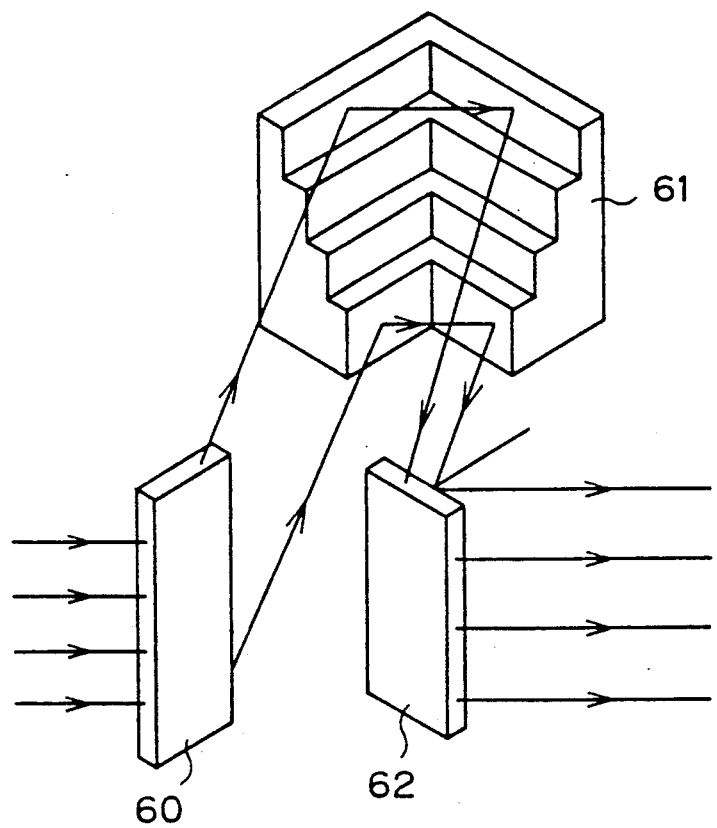
FIG. 17 is a diagram depicting the structure of the delay unit.
Figure 19:
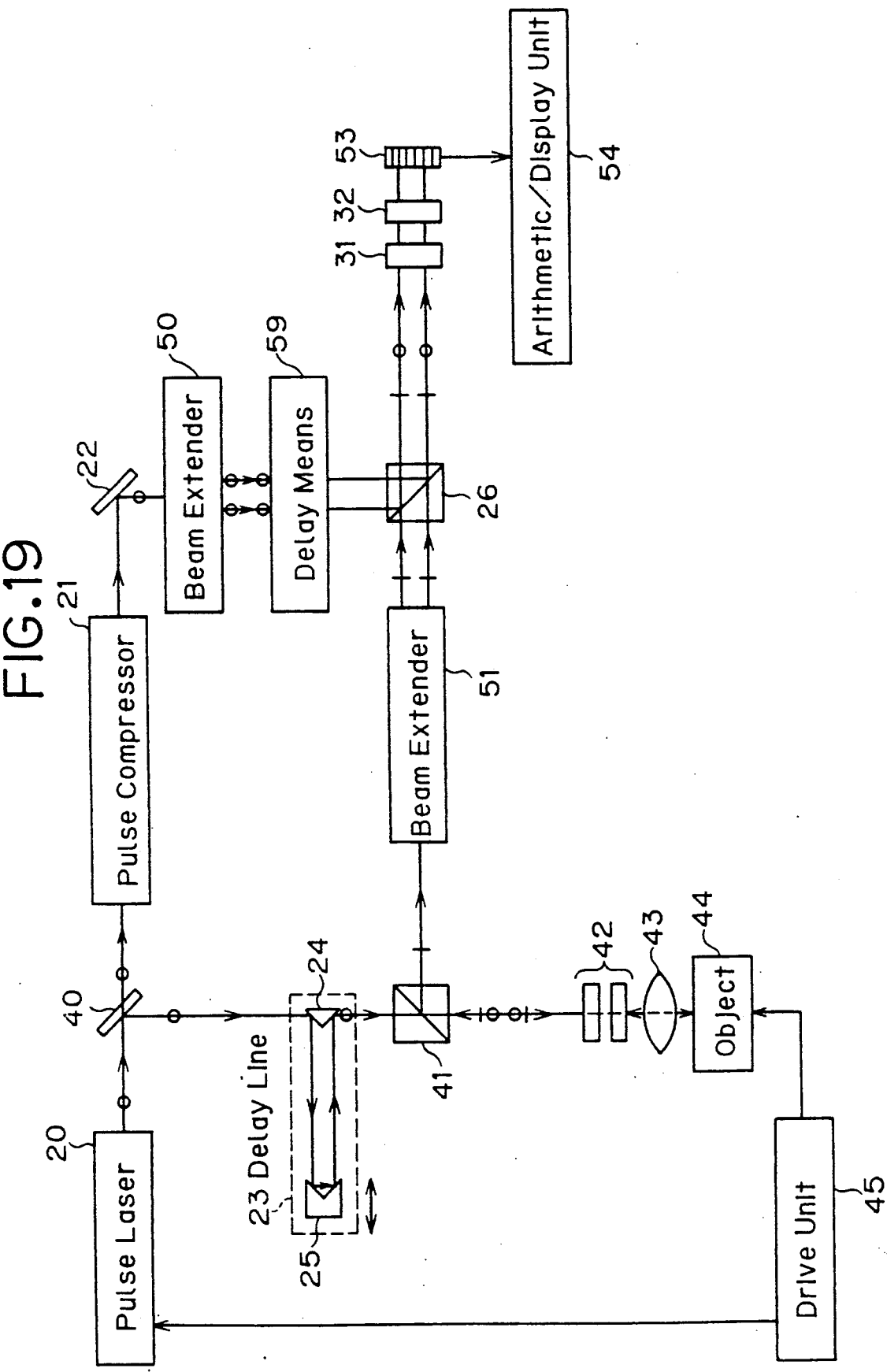

FIG. 19 shows a modification of the embodiment of FIG. 18, wherein the similar parts have similar numbers and description thereof hereat is omitted for sake of clarity. In FIG. 19, Babinet compensator 52 is replaced by delay means 59 which is inserted into the optical path between beam extender 50 and polarizer 26 so that the reference light is given a delay time different for its different positions. The measurement technique is similar to that used in the embodiment of FIG. 15. Delay means 59 can be a Babinet compensator or a multistage corner cube, such as depicted in FIG. 17.

Figure 20:
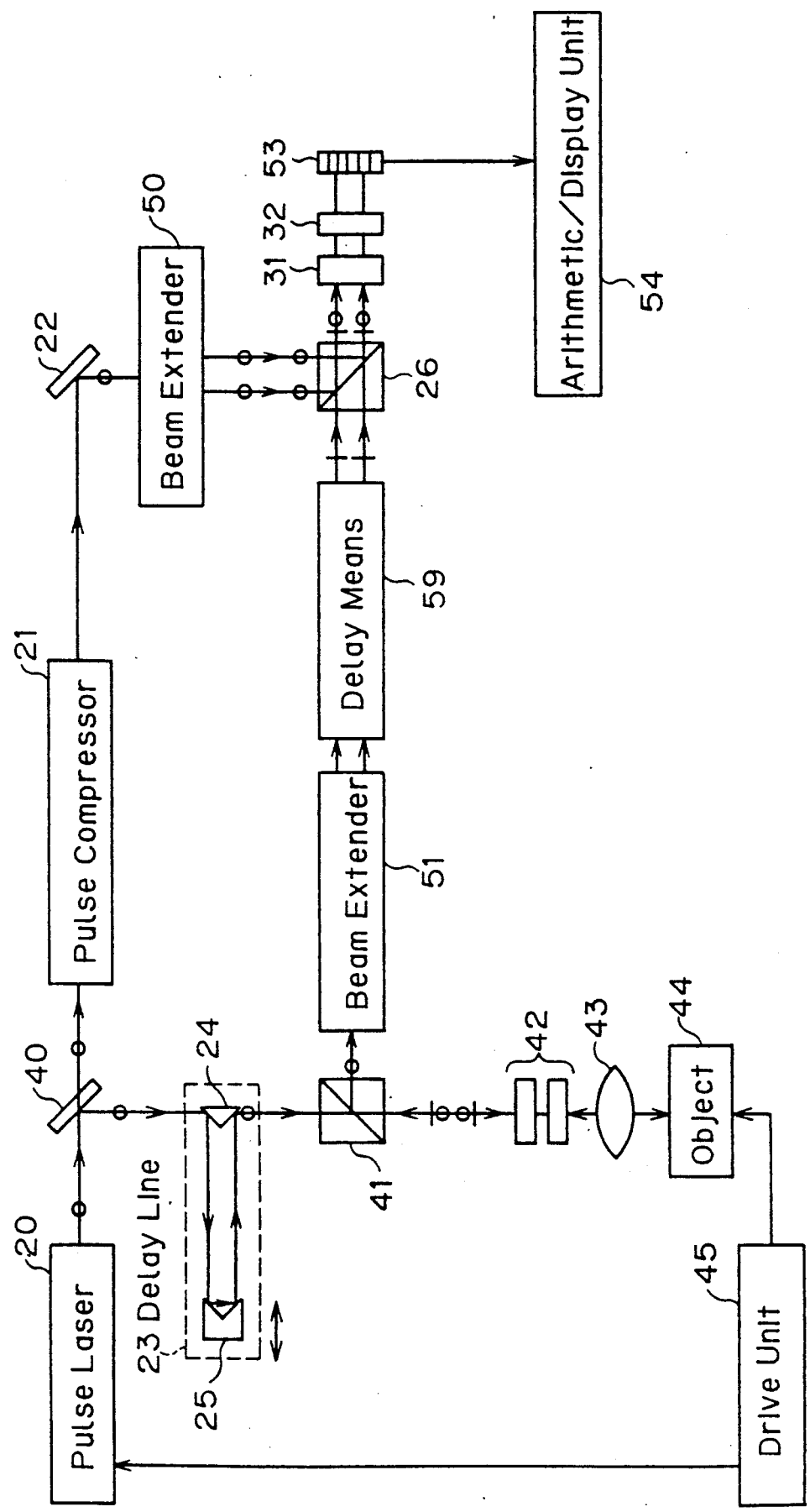

FIG. 20 is another modification of the embodiment of FIG. 18, wherein similar parts bear similar reference numerals and description hereat is omitted for sake of clarity. In FIG. 20, delay means 59 is inserted into the optical path between beam extender 51 and polarizer 26 to give the reflected light from object 44 a delay time different for the different positions of same. Measurement is done in a manner similar to that used for the FIG. 15 embodiment. Delay means 59 can be the Babinet compensator or the multistage corner cube shown in FIG. 17. In Place of delay line 23, the drive timings of object 44 and laser 20 may be adjusted by drive unit 45 so that the reference light and the reflected light from the object may take the relationships shown in FIG. 12.

in these embodiments, the secondary higher harmonic is generated by higher harmonic generating means 31 so that its optical intensity may be measured, assuming that the reference light and the object light have equal wavelengths. In case the wavelengths are different, however, the secondary higher harmonic having a wavelength of their sum or difference may be generated. Moreover, the secondary higher harmonic may be replaced by a higher harmonic more than a third harmonic. In these cases, the characteristics of the filter 32 are changed according to the wavelength generated.

In order to generate the reference light, moreover, laser 20 and pulse compressor 21 are used, but, another structure may be used if optical pulses of narrower widths can be generated.

In the embodiments of FIGS. 7 to 9 and FIGS. 18 to 20, on the other hand, in case object 44 is made of a substance such as silicon having no electrooptic properties, a substance such as a single crystal of LiTaO$_3$ having electrooptic properties is positioned close to the object 44 so that the resultant electric field may be measured by the single crystal of LiTaO$_3$.

in the same embodiment, moreover, the light, which is compressed on the time axis by pulse compressor 21, is used as the reference light so that the light reflected by half mirror 40 is used to irradiate object 44. However, the light compressed on the time axIs by pulse compressor 21 may be used to irradiate object 44 so that the light reflected by half mirror 40 may be used as the reference light.

The foregoing description is illustrative of the principles of the invention. Numerous modifications and extensions thereof would be apparent to the person skilled in the art. All such modifications and extensions are to be considered to be within the spirit and scope of the invention.

What is claimed is:

1. A measuring device using an optical beam, said device comprising:
    means for generating an object light having a first time width;
    optical pulse generating means for generating a reference light having a shorter time width than said first time width, said optical pulse generating means being separate from said means for generating an object light;
    delay means for delaying said reference light by a predetermined time;
    composing means for composing the delayed reference light and said object light with the reference light and the object light being overlapped on a time axis;
    higher harmonic generating means made receptive of the output light from said composing means for generating by a non-linear effect a higher harmonic having an intensity proportional to the product of the intensity of the reference light and the intensity of the object light;
    a filter made receptive of the output from said higher harmonic generating means for transmitting only a light of a specified wavelength; and
    a light receiving element made receptive of the output light from said filter for converting the optical intensity thereof into electric signals whereby the delay of said delay means is made variable so that the characteristics thereof can be measured.

2. The device of claim 1, wherein said delay means is disposed at the side of the optical path of said object light to delay said object light in place of said reference light.

3. The device of claim 1, further comprising a drive unit for driving said optical pulse generating means at a set timing, and said means for generating said object light so that said object light is scanned with said reference light by said drive unit electrically controlling the timing of said driving.

4. A measuring device using an optical beam, said device comprising:
    first optical pulse generating means for irradiating an object with an output light;
    second optical pulse generating means for generating a reference light having a shorter time width than the time width of the output light from said first optical pulse generating mean;
    delay means inserted into the optical path of said reference light for delaying the reference light by a predetermined time;
    composing means for composing the reference light and the object light in a predetermined plane of the output light from said delay means and a reflected light from said object;
    higher harmonic generating means receptive of the composed light for generating a higher harmonic by a non-linear optical effect;
    a filter made receptive of the output light from said higher harmonic generating means for transmitting only a light of a predetermined wavelength; and
    a light receiving element made receptive of the output light from said filter for converting the optical intensity thereof into electric signals, whereby the delay of said delay means is made variable so that the amount of electricity on said object can be measured.

5. The device of claim 4, wherein said delay means is disposed in the optical path of the reflected light from said object to delay said reflected light in place of said reference light.

6. The device of claim 4, further comprising a drive unit for driving said object and said second optical pulse generating means so that the reflected light from said object is scanned with said reference light by said drive unit selectively controlling the timing of driving of said object and said second optical pulse generating means.

7. A measuring device using an optical beam, said device comprising:
   an object light of a first time width;
   optical pulse generating means for generating a reference light having a shorter time width than said first time width;
   composing means for composing said reference light and said object light;
   delay means made receptive of the output light from said composing means for delaying the light in a predetermined plane of polarization to an extent different according to the distance in a plane perpendicular to the advancing direction of said light;
   higher harmonic generating means made receptive of the output light from said delay means for generating a higher harmonic by a non-linear optical effect;
   a filter made receptive of the output light from said higher harmonic generating means for transmitting only a light having a predetermined wavelength; and
   a line sensor made receptive of the output light from said filter for measuring the spatial distribution of the optical intensity thereof, whereby the characteristics of said object light are measured from the spatial distribution of the optical intensity detected by said line sensor.

8. The device of claim 7, wherein said delay means is inserted into the optical path of said object light to give said object light a delay different according to the distance in a plane perpendicular to the advancing direction of said object light so that the delayed object light and said reference light are composed to introduce the composed light into said higher harmonic generating means for generating the higher harmonic by said non-linear optical effect.

9. The device of claim 7, wherein said delay means is inserted into the optical path of said reference light to give said reference light a delay different according to the distance in a plane perpendicular to the advancing direction of said reference light so that the delayed reference light and said object light are composed to introduce the composed light into said higher harmonic generating means for generating the higher harmonic by said non-linear optical effect.

10. A measuring device using an optical beam, said device comprising:
    first optical generating means for irradiating an object with an output light;
    second optical generating means for generating a reference light having a shorter time width than the output light from said first optical pulse generating means;
    composing means for composing said reference light and the light in a predetermined plane of polarization of a reflected light from said object;
    delay means made receptive of the output light from said composing means for giving the light in said predetermined polarization plane a delay different according to the distance in a plane perpendicular to the advancing direction of said light;
    higher harmonic generating means made receptive of the delayed light for generating a higher harmonic by a non-linear optical effect;
    a filter made receptive of the output light from said higher harmonic generating means for transmitting a light of predetermined wavelength; and
    a line sensor made receptive of the output light from said filter for measuring the spatial distribution of the optical intensity thereof, whereby the amount of electricity on said object is measured from the spatial distribution of the optical intensity detected by said line sensor.

11. The device of claim 10, wherein said delay means is inserted into the optical path of the reflected light from said object to give said reflected light a delay different according to the distance in a plane perpendicular to the advancing direction of said reflected light so that the delayed reflected light and said reference light are composed to introduce the composed light into said higher harmonic generating means for generating the higher harmonic by said non-linear optical effect.

12. The device of claim 10, wherein said delay means is inserted into the optical path of said reference light to give said reference light a delay different according to the distance in a plane perpendicular to the advancing directions of said reference light so that the delayed reference light and the reflected light from said object are composed to introduce the composed light into said higher harmonic generating means for generating the higher harmonic by said non-linear optical effect.

* * * * *